United States Patent
Kulkarni

(10) Patent No.: US 9,559,968 B2
(45) Date of Patent: Jan. 31, 2017

(54) TECHNIQUE FOR ACHIEVING LOW LATENCY IN DATA CENTER NETWORK ENVIRONMENTS

(71) Applicant: CISCO TECHNOLOGY, INC., San Jose, CA (US)

(72) Inventor: Ajay A. Kulkarni, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 136 days.

(21) Appl. No.: 14/665,960

(22) Filed: Mar. 23, 2015

(65) Prior Publication Data

US 2016/0285771 A1    Sep. 29, 2016

(51) Int. Cl.
| | | |
|---|---|---|
| H04W 4/00 | (2009.01) | |
| H04L 12/819 | (2013.01) | |
| H04L 12/861 | (2013.01) | |
| H04L 12/851 | (2013.01) | |
| G06F 13/26 | (2006.01) | |

(52) U.S. Cl.
CPC .......... *H04L 47/215* (2013.01); *H04L 47/21* (2013.01); *H04L 47/2483* (2013.01); *H04L 49/90* (2013.01); *G06F 13/26* (2013.01)

(58) Field of Classification Search
CPC .... H04L 12/819; H04L 12/861; H04L 47/215; H04L 49/90
USPC .................................................. 370/235, 250
See application file for complete search history.

(56) References Cited

U.S. PATENT DOCUMENTS

| | | | | |
|---|---|---|---|---|
| 6,205,149 B1 * | 3/2001 | Lemaire | ............ | H04L 12/40032 370/400 |
| 6,862,265 B1 * | 3/2005 | Appala | ............... | H04L 12/5693 370/235 |
| 7,792,131 B1 * | 9/2010 | Ma | ...................... | H04L 12/5693 370/230 |
| 8,478,924 B2 | 7/2013 | Ahmad et al. | | |
| 8,612,661 B2 | 12/2013 | Shimada | | |
| 8,854,972 B1 * | 10/2014 | Li | ............................ | H04L 47/12 370/235 |
| 2002/0107984 A1 * | 8/2002 | Rawson, III | ............ | H04L 29/06 709/246 |
| 2008/0259798 A1 * | 10/2008 | Loh | ........................ | H04L 45/302 370/235 |
| 2009/0240802 A1 * | 9/2009 | Shankar | ............... | H04L 41/0853 709/224 |

(Continued)

OTHER PUBLICATIONS

Hedlund, "Cisco UCS and Nexus 1000V design diagram with Palo adapter," © 2014, 18 pages.

(Continued)

*Primary Examiner* — Farah Faroul
(74) *Attorney, Agent, or Firm* — Patent Capital Group

(57) ABSTRACT

An example method is provided and includes maintaining at a network element a flow table, in which the flow table comprises a plurality of flow table entries and in which each of the flow table entries corresponds to one of a plurality of active data flows in a network, and, subsequent to receipt at the network element of a data packet of one of the active flows, characterizing the one of the active flows as a large flow or a short flow using values contained in the flow table entry corresponding to the one of the active flows. The method further includes processing the received packet in accordance with the characterization.

20 Claims, 4 Drawing Sheets

(56) References Cited

U.S. PATENT DOCUMENTS

| | | | | |
|---|---|---|---|---|
| 2010/0054126 A1* | 3/2010 | Kwan | ............... | H04L 47/10 370/235 |
| 2010/0195492 A1* | 8/2010 | Harmatos | ............... | H04L 47/10 370/230 |
| 2010/0274940 A1* | 10/2010 | Ahmad | ............... | G06F 9/4812 710/267 |
| 2011/0096666 A1* | 4/2011 | Davari | ............... | H04L 47/10 370/235 |
| 2011/0292792 A1* | 12/2011 | Zuo | ............... | H04L 47/20 370/230 |
| 2012/0005367 A1* | 1/2012 | Bettink | ............... | H04L 47/41 709/233 |
| 2013/0297832 A1 | 11/2013 | Ahmad et al. | | |
| 2014/0059160 A1* | 2/2014 | Chernoff | ............... | H04L 49/70 709/217 |
| 2014/0126393 A1* | 5/2014 | Kirshnan | ............... | H04L 43/026 370/252 |
| 2014/0241164 A1 | 8/2014 | Cociglio et al. | | |
| 2014/0269401 A1* | 9/2014 | Gondi | ............... | H04L 43/0876 370/253 |
| 2014/0341040 A1* | 11/2014 | Lee | ............... | H04W 74/0816 370/235.1 |
| 2015/0163144 A1* | 6/2015 | Koponen | ............... | H04L 47/125 370/237 |
| 2016/0197846 A1* | 7/2016 | Bernstein | ............... | H04L 47/806 375/222 |

OTHER PUBLICATIONS

PCT Jun. 24, 2016 International Search Report and Written Opinion from International Application Serial No. PCT/US2016/023624.

Alizadeh, Mohammad, et al., "Less is More: Trading a little Bandwidth for Ultra-Low Latency in the Data Center," USENIX, Apr. 11, 2013; XP061014282, 14 pages.

* cited by examiner

TECHNIQUE FOR ACHIEVING LOW LATENCY IN DATA CENTER NETWORK ENVIRONMENTS

TECHNICAL FIELD

This disclosure relates generally to data center network environments and, more particularly, to techniques for achieving low latency in such network environments.

BACKGROUND

A variety of applications and platforms have recently arisen that require very low latency in the data centers in which they are implemented. One such application is "MapReduce," which follows the request-response (or request-reply) model. Request-response is one of the basic techniques used by computing devices to communicate with one another and involves a first computing device sending a request for data to a second computing device and the second device responding to the request. Typically, there will be a series of interchanges until the complete message is sent from the second computing device to the first computing device. In MapReduce applications, the request is split into multiple smaller sub-requests, each of which may be sent to one of multiple different servers in a data center. The transaction is deemed complete once responses to all of the sub-requests have been received from the servers. Because the last response received determines completion of the transaction, the Once the response to each of the sub-requests is received from all of the servers, the transaction is complete. Since the last response received determines completions of the transaction, the tail latency of the individual sub-requests are important and required to be as small as possible.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
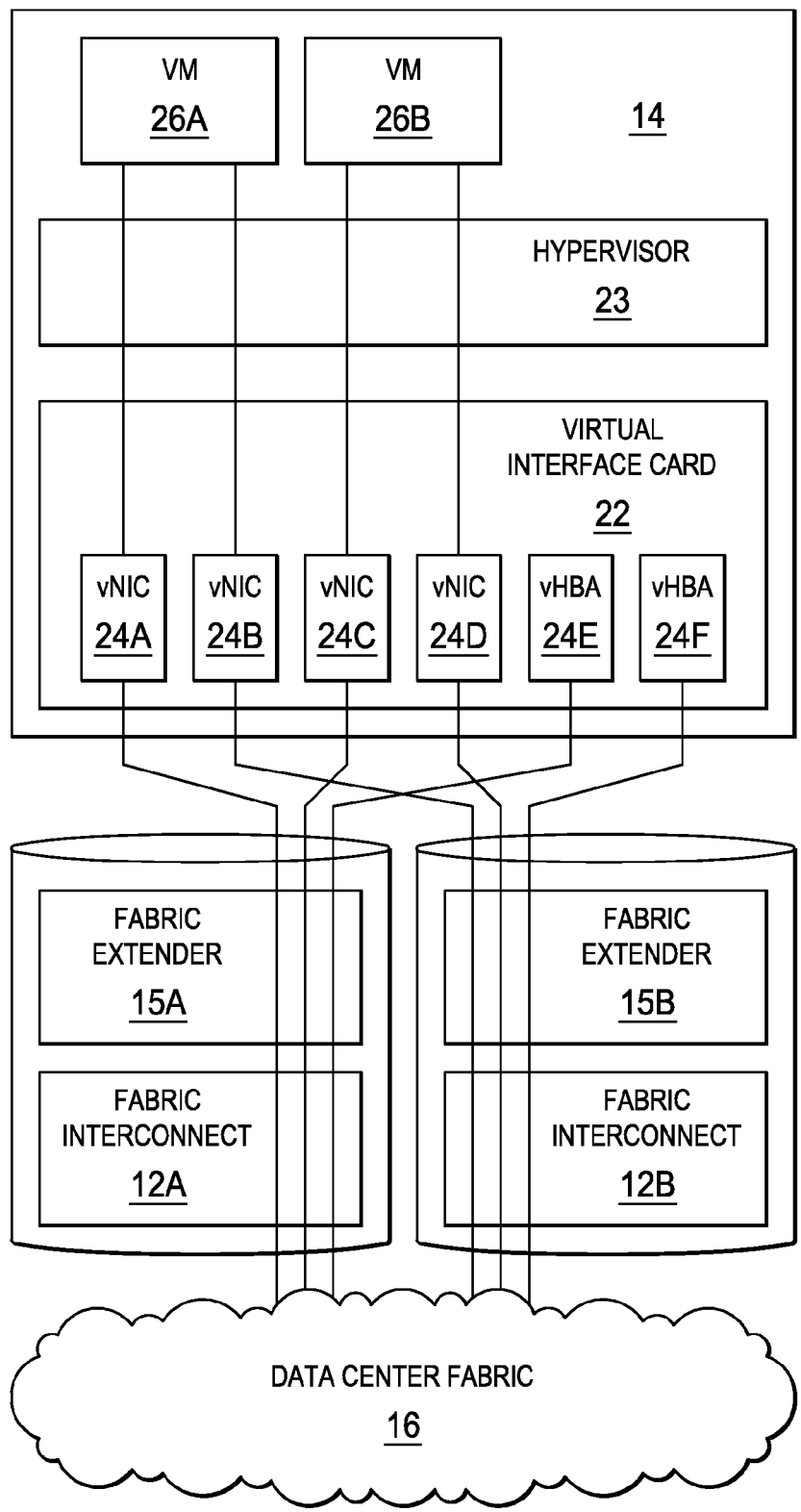
FIG. 1 is a simplified block diagram of a system for reducing data packet transmission latency in a data center environment in accordance with an embodiment of the present disclosure.

An example method is provided and includes maintaining at a network element a flow table, in which the flow table comprises a plurality of flow table entries and in which each of the flow table entries corresponds to one of a plurality of active data flows in a network, and, subsequent to receipt at the network element of a data packet of one of the active flows, characterizing the one of the active flows as a large flow or a short flow using values contained in the flow table entry corresponding to the one of the active flows. The method further includes processing the received packet in accordance with the characterization. In some embodiments, the processing the received packet in accordance with the characterization comprises, if the one of the flows is characterized as a large flow, pacing transmission of packets of the one of the flows using a token bucket to control a rate at which packets of the one of the flows are transmitted, wherein packets awaiting transmission are queued in a buffer. In certain embodiments, the pacing is deployed using a dynamic pacing strategy, wherein a bucket fill rate is modified depending on an amount of data of the one of the flows received during a predetermined time period.

In some embodiments, the processing the received packet in accordance with the characterization comprises reducing interrupt coalescence ("IC") if the one of the flows is a short flow and increasing the IC if the one of the flows is a large flow. The characterizing may include determining whether the one of the flows has a recent start time, determining whether the one of the flows occurs frequently, and/or determining whether a flow rate of the one of the flows is low.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to FIG. 1, illustrated therein is a simplified block diagram of a system 10 in which techniques for achieving low latency may be implemented. As shown in FIG. 1, the system 10 includes a pair of switching devices 12A, 12B, for connecting a server 14 to data center fabric 16. The switching devices 12A, 12B, may be implemented as fabric interconnects, which as described in greater detail below support both FC and Ethernet protocols. Additionally, although not necessary to operation of the system 10, one or more fabric extenders 15A, 15B, may also be provided. The primary function of the fabric extenders 15A, 15B, is to increase the number of physical ports available in the system 10, thereby increasing the number of servers, such as the server 14, that may be connected to the system. The servers, including the server 14, may be connected to the switching devices 12A, 12B, either directly or through the fabric extenders 15A, 15B. In some embodiments, the server 14 may be implemented as a Cisco UCS B-Series Blade Server.

In one embodiment, the system 10 is implemented in accordance with the Cisco Unified Computing System ("UCS") architecture developed by Cisco Systems, Inc., of San Jose, Calif. In general, UCS is data center platform that unites compute, network storage access, and virtualization into a single cohesive system designed to decrease implementation costs and increase agility. UCS may support automatic in-band discovery of computers, or servers, and their components, including FC storage adapters. Further, UCS may maintain an inventory of the discovered servers, monitoring the health of the discovered servers. These processes occur without the user being required to enter any device credentials. Additionally, UCS may provide inventory reports to users and provides a role-based access control ("RBAC") system, such that provisioning tasks can be separated, for example between server administrators and storage administrators. A fully redundant UCS system includes two independent fabric planes: Fabric A and Fabric B. Each plane includes a central fabric interconnected connected to an input/output ("I/O") module, implemented as a fabric extender, in each blade server chassis. The two fabric interconnects are completely independent from the perspective of the data plane. Cisco UCS can function with a single fabric interconnect if the other fabric is offline or not provisioned.

UCS is inherently stateless, with logical configuration specifications referred to as service profiles dictating every aspect of server provisioning, including I/O configurations, firmware revisions, and settings, thereby speeding up virtual infrastructure provisioning. Once created, a service profile can be deployed on any physical server that supports the logical configuration requirements. The service profile may also specify whether to use the world-wide name ("WWN") addresses burned in the server hardware or to substitute virtual WWN addresses therefor. Logical servers can be defined even if no physical server is connected. In this manner, UCS enables logical servers to be deployed over physical servers, which causes the physical server to be configured as specified in the service profile, including WWN addresses for storage adapters. UCS uses a standards-based, low-latency, high-bandwidth 10 Gigabit Ethernet and Fibre Channel over Ethernet ("FCoE") network for all traffic, communications, and storage. UCS thereby simplifies connectivity to the storage array by interconnecting UCS servers as a single system and linking that system directly to the Ethernet and FC aggregation layer.

In one embodiment, the compute component of UCS comprises a powered server chassis and multiple full or half slot bade servers. UCS supports a variety of hypervisors, including, for example, VMware ESX and ESXi, both available from VMware, Inc., of Palo Alto, Calif., Hyper-V, available from Microsoft Corporation of Redmond, Wash., and XenServer, available from Citrix Systems, Inc., of Fort Lauderdale, Fla., to name just a few. VMware ESX and ESXi are "bare metal" hypervisors, which run directly on the server hardware without the need for any other software and provide the necessary functions to host several guest OSes on the physical server. Additionally, virtual network interface cards ("vNICs") may employ technology that provides VMs direct access to the server hardware for improved performance and network visibility.

As previously noted, the fabric interconnects 12A, 12B, which may be implemented using Nexus 6100 or 6200 series switches, available from Cisco Systems, Inc., provide network connectivity for the servers connected to it through 10 Gigabit and fiber channel over Ethernet ("FCoE"). Each fabric interconnect can further connect to multiple fabric extenders, which may be implemented using Nexus 2100 series fabric interconnects comprising port extenders allowing up to 160 servers to be managed by a single fabric interconnect. In one embodiment, each fabric interconnect includes physical ports to which up to 20 server chassis, which may be implemented using Cisco 5100 series blade server chassis, can be connected. Each chassis can hold up to eight ½ width blade servers or four full width blade servers; therefore, a total of up to 160 (½ blade) servers can be connected to each switch.

As previously noted, UCS is a stateless computing system. In particular, each compute node has no set configuration. MAC addresses, UUIDs, firmware, and BIOS settings, for example, are all configured via the UCS manager module via service profiles applied to the servers, such as the server 14. This enables consistent configuration and facilitates repurposing of servers, as a new service profile can be applied to a server in a manner of minutes.

Referring again to FIG. 1, in accordance with features of one embodiment, the server 14 includes a virtual interface card ("VIC") 22, which is a physical adapter that can perform PCI virtualization by dynamically instantiating PCI devices on the server, and a hypervisor 23 for managing a plurality of VMs instantiated on the server 14. The VIC 22 may be designed for both single OS and VM-based deployments, supporting network interface virtualization and VM-link capable hypervisor integration. In particular, the VIC 22 can be used to provision more than 100 virtual PCI adapters, represented in FIG. 1 by adapters 24A-24G, which may comprise virtual network interface cards ("vNICs") and virtual host bus adapters ("vHBAs"), each of which has its own characteristics and can be used for networking or storage. In the illustrated embodiment, several of the adapters (e.g., adapters 24A-24D) comprise vNICs for providing connections to VMs 26A-26B, instantiated on the server 14. In one embodiment, the VIC 22 is implemented as a Cisco UCS 1280 virtual interface card ("VIC") available from Cisco Systems, Inc. For purposes that will be explained in detail below, adapter firmware 30 is embedded in and executed by the VIC 22. As previously noted, in one embodiment, the VIC 22 is able to instantiate multiple FC vHBAs (e.g., adapters 24E, 24F) and/or multiple Ethernet vNICs (e.g., adapters 24A-24D) from a single physical adapter (i.e., VIC 22). vHBAs exposed to the hypervisor 23 are used to send and receive FC traffic. Similarly, vNICs exposed to the hypervisor 23 are used to send and receive Ethernet traffic.

In a modern data center, such as that illustrated in FIG. 1, a full-sized packet can be forwarded in microseconds (i.e., 1.2 μs for 1500 bytes at 10 Gigabits per second ("Gbps")) and the switching latency is of the order of hundreds of nanoseconds. In contrast, the end-to-end latency can reach up to a few microseconds for packet delivery, due primarily to queue buildup and queueing delays along the delivery path. Techniques such as zero-buffer copy and kernel bypass aim to improve latency; however, they primarily merely shave off minor delays and fail to address major delays, such as those attendant to queuing.

Two factors that may result in or increase queuing delays are (1) Large Send Offloading ("LSO") and (2) Interrupt Coalescing ("IC"). LSO is a technique deployed in computer networks for increasing the outbound throughput of high-bandwidth network connections by reducing CPU overhead. It will be recognized that, when a computer system needs to send large chunks of data out over a computer network, the chunks first need breaking down into smaller segments that can be managed by the various network elements (e.g., switches and routers) that lie between the source computer and destination computer. Using LSO, the host CPU of the source computer can hand over a large unit (e.g., 64 kB) of data to the NIC in a single transmit-request. The data unit is queued at the NIC, which eventually breaks the data down into smaller segments of data, adds the various protocol headers, and sends the resulting frames over the network. This significantly reduces the work to be performed by the CPU and enables data rates of 10 Gbps and more, since the CPU does not have to perform segmentation and packetizing (thus saving precious CPU cycles); however, it necessarily results in temporary queue buildup at the NIC and therefore increased latency.

IC is a standard feature in current NICs to delay interrupting the CPU and wait for lager batches of packets to be processed in one interrupt. Using IC, events that would normally trigger a hardware interrupt (e.g., arrival of a data packet for processing) are held back until a certain amount of work is pending or a timeout timer triggers. Used properly, IC can reduce the interrupt load by an order of magnitude; however, the greater the coalescence, the greater the latency experienced by a packet as it awaits processing by the CPU. IC also causes disruption of the TCP-ACK clocking mechanism. As a result, many MTU worth of data are release by the TCP in a burst, thereby resulting in additional latency.

Referring again to FIG. 1, in accordance with features of embodiments described herein, the VIC 22 includes hardware flow tables 32 for purposes that will be described in greater detail hereinbelow. In one embodiment, the flow tables 32 comprise 16 flow tables with 128k flow records each, giving the flow tables the capability of storing more than a million distinct flow entries. In certain embodiments, UCS features, like adapter-based Netflow, make use of flow tables to report and analyze flows. Each entry in a flow table is indexed by a set of keys corresponding to the flow. The keys are typically a five-tuple, including VLAN identification ("vlan"), source IP address ("src ip"), destination IP address ("dest ip"), source port ("src port"), and destination port ("dest port"). Along with the set of keys are non-keys, which are aggregated values. For example, Netflow uses non-keys including packet count ("pkt cnt"), byte count ("byte cnt"), flow start time ("flow_start_time"), and flow end time ("flow_end_time"). As previously noted, the non-keys are aggregated values, so multiple packets of the same flow are aggregated as a single flow table entry. In accordance with features of embodiments described herein, the keys and non-keys may be set in hardware, making the classification and updates extremely fast without negatively affecting performance.

Embodiments described herein make use of "flow-table based pacing" and "flow-table based IC" techniques to reduce latency in a data center network environment. Each technique will be described in greater detail hereinbelow. Flow table based pacing will be addressed first and will be described in connection with a simplified block diagram presented in FIG. 2. As previously noted, modern NICs (including vNICs) employ schemes such as LSO to reduce CPU utilization and increase link speeds. As link speeds increase to 10 Gbps and beyond, such hardware offloading is unavoidable. To reduce queueing delays caused by queue build-up as a result of dealing with sudden large (e.g., 64K) bursts of data, flow table based pacing is introduced. As described herein, a pacer module for implementing a dynamic pacing strategy described herein employs a rate limiter mechanism, which in some embodiments may be implemented using a token bucket. It will be recognized that in data centers, flows may be categorized into one of two types, including "short flows" and "large flows". Short flows are flows that are latency-sensitive. Large flows are primarily throughput-sensitive, but not particularly latency-sensitive. In accordance with features of embodiments described herein, large flows are "paced," as will be described hereinbelow; short flows, because of their latency-sensitivity, are not paced.

In accordance with features of embodiments described herein, for each active flow, non-key fields of the corresponding entry in the flow table, such as flow table 52, are used to accumulate statistics, such as packet count, byte count, flow start time, and flow end time, for the flow.

Figure 2:
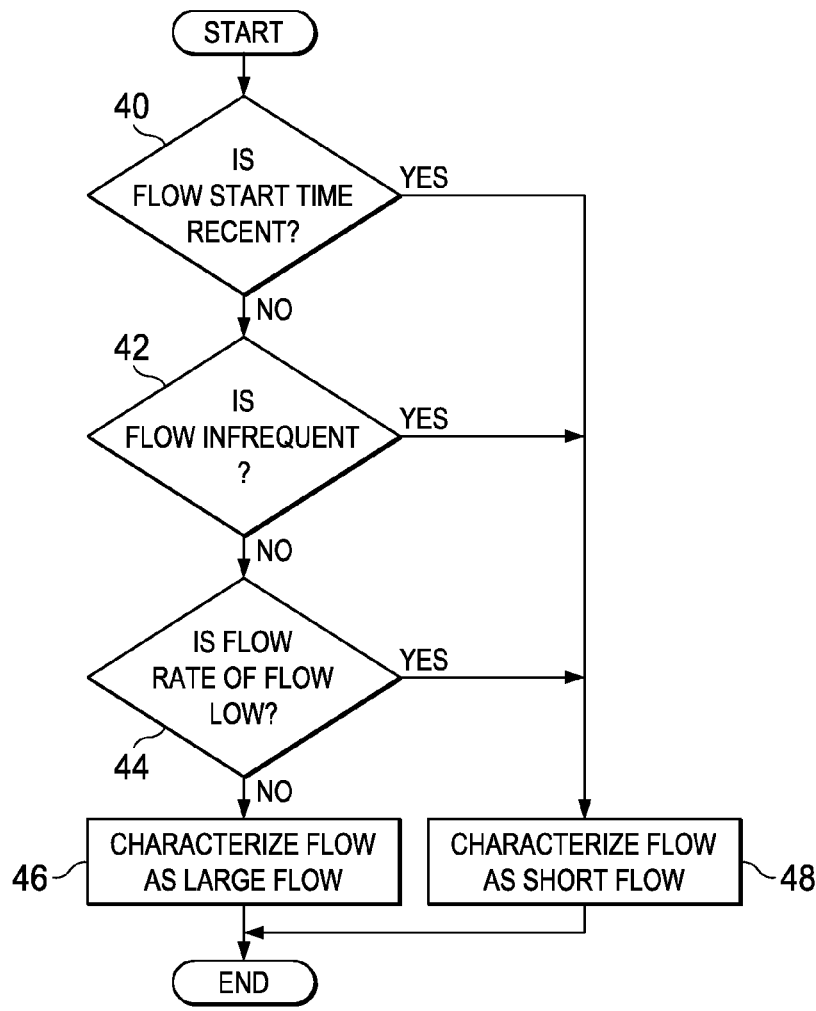
FIG. 2 is a flowchart illustrating a technique for characterizing a flow as a short flow or a large flow in accordance with an embodiment of the present disclosure.

FIG. 2 is a flow diagram illustrating steps involved in categorizing a flow as a short flow or a large flow in accordance with embodiments described herein. Referring to FIG. 2, in step 40, a determination is made whether the flow start time is recent. A flow start time is deemed "recent" if, for example, less than 10 ms have elapsed since the flow start time as indicated in the flow record for the flow. If it is determined in step 40 that the flow start time is not recent, execution proceeds to step 42. In step 42, a determination is made whether the flow is infrequent. A flow is deemed "infrequent" if the number of packets collected ("packet_cnt") since the flow start time is less than a number K. If it is determined in step 42 that the flow is not infrequent, execution proceeds to step 44. In step 44, a determination is made whether the rate of sending is low. A flow rate of sending is deemed "low" if the last n packets received for the flow are sufficiently spread out over time. In other words, if the packet rate is less than a rate R. If it is determined in step 44 that the flow rate of sending is not low, execution proceeds to step 46. In step 46, the flow is deemed a large flow and a dynamic pacing strategy, as will be described in detail below, is applied to the flow. If a positive determination is made in any of steps 40, 42, or 44, execution proceeds to step 48, in which the flow is deemed a "short flow" and is subjected to normal, (i.e., non-paced) processing. It will be recognized a flow table entry will be purged from the flow table if it has remained inactive (i.e., no packets have been received in connection with the associated flow) for T seconds.

In accordance with features of embodiments described herein, a dynamic pacing strategy is employed in which a token generation rate is set to an initial rate and thereafter influenced by the rate of packets coming in for the flow. In one embodiment, the token generation rate ("TGR") (or bucket fill rate) is defined by the following equation:

$$TGR = (1-\alpha) \times current\_rate + \alpha(B1/T1)$$

where $\alpha$ is a constant in the range of 0 to 1, current_rate is the current token generation rate, and B1 Is the number of bytes received in time T1. As a result, the pacer records the bytes received in the time period T1 and modifies the pacer rate of token generation using the hysteresis of the above equation.

Figure 3:
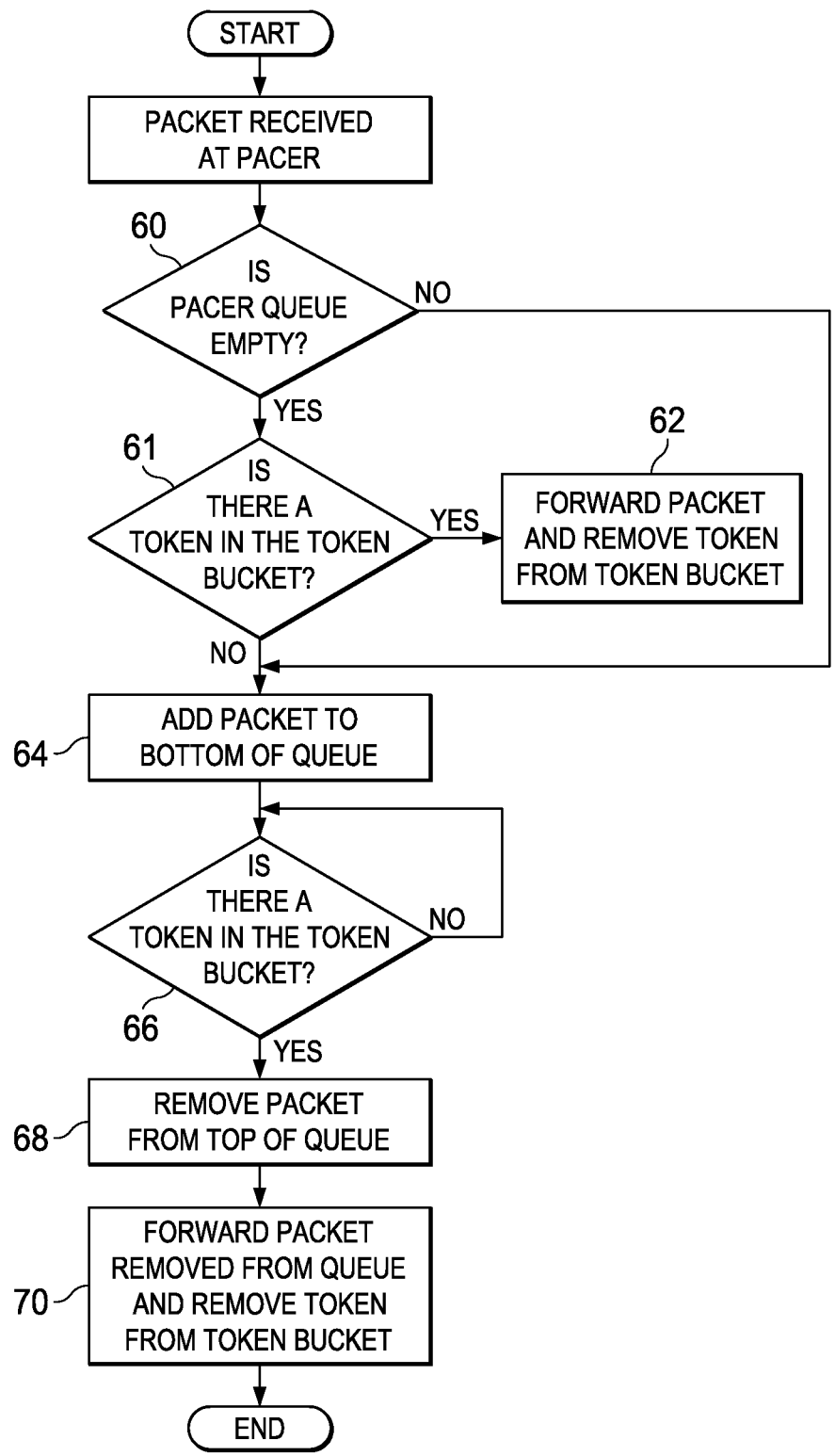
FIG. 3 is a flowchart illustrating a technique for implementing a dynamic pacing strategy in accordance with an embodiment of the present disclosure.

As previously noted, the pacer is a rate limiter mechanism, which is implemented in the current example embodiments as a token bucket. Accordingly, for flows introduced to the pacer module, a packet of that flow is transmitted from the pacer only when a token is available in accordance with the above-noted TGR; otherwise, the packet is held in a queue of the pacer module. For example, referring to FIG. 3, in step 60, for each packet introduced to the pacer, a determination is made whether a packet queue maintained by the pacer is empty. If a positive determination is made in step 60, execution proceeds to step 61, in which a determination is made whether there is a token in the token bucket. If a positive determination is made in step 61, execution proceeds to step 62, in which the received packet is forwarded to the next hop and a token is removed from the token bucket. If a positive determination is made in step 60, execution proceeds to step 64, in which the packet is queued to await the next token. Similarly, if in step 61 it is determined that there is not a token in the token bucket, execution also proceeds to step 64. Upon completion of step 64, execution proceeds to step 66, in which a determination is made whether there is a token in the token bucket. If a negative determination is made in step 66, execution remains at step 66 until the bucket is refilled. Once a positive determination is made in step 66, execution proceeds to step 68, in which the top packet in the queue is removed and then to step 70, in which the packet is forwarded to the next hop and a token is removed from the token bucket.

Flow-based IC ("FIC") will now be described in greater detail. In general, the idea of FIC is dynamically to reduce the time of coalescence for short-lived flows. Based on flow statistics collected and aggregated in the flow table entry for a flow, it can be determined whether the flow has been active for a long or short time period and thus classify the flow as a large flow or a short flow. Every NIC can be programmed to set interrupt coalescing by changing the "rx-frames" parameter appropriately. A low rx-frames parameter value corresponds to low interrupt coalescence (i.e., less consolidation of CPU interrupts and therefore more CPU interrupts). A high rx-frames parameter value corresponds to high interrupt coalescence (i.e., more consolidation of CPU interrupts and therefore fewer CPU interrupts).

Each received packet is hashed into the flow table and classified as a short flow or long flow, as described above with reference to FIG. 2. If a packet arrives and is detected to be a short lived flow, the rx-frames parameter will be set to a certain number of packets (e.g., 2). The rx-frames parameter indicates the number of received packets that will trigger an interrupt to the CPU to process the frames. If the packet belongs to a short flow, then the rx-frames parameter will be set to a small number, e.g., 2. Alternatively, if the packet belongs to a large flow, then the rx-frames parameter may be set to a higher number, e.g., 8 or 16. Setting of the rx-frame parameter can also be performed dynamically. For example, if a continuous stream of k short flow packets have been received, the rx-frames parameter can be reduced by a factor of two until a lower limit (e.g., rx-frame=2) is reached. Alternatively, if a large flow packet is received after expiration of a predetermined period of time without any short flow packets being received, then the rx-frame can be reset to an original, high value (e.g., rx-frame=8 or 16).

Figure 4:
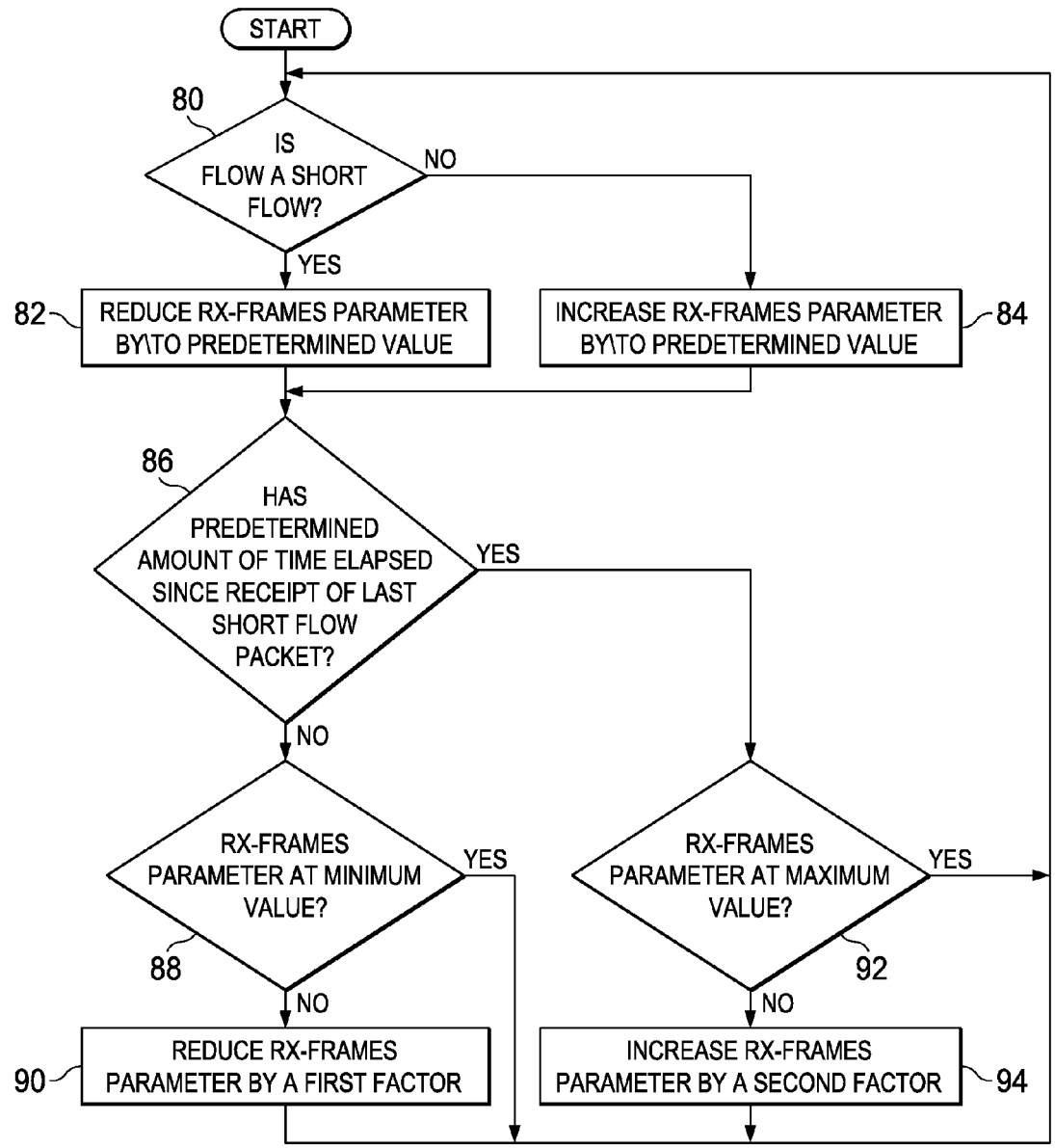
FIG. 4 is a flowchart illustrating a technique for implementing Flow-Based Interrupt Coalescence ("FIC") in accordance with an embodiment of the present disclosure.

FIG. 4 is a flowchart illustrating operation of the FIC process in accordance with embodiments described herein. Referring to FIG. 4, in step 80, upon receipt of a packet, a determination is made whether the corresponding flow is a short flow (e.g., using the procedure described with reference to FIG. 2). If the received packet is part of a short flow, execution proceeds to step 82, in which the rx-frames parameter is reduced by (or to) a first predetermined first value (reducing the interrupt coalescence). If it is determined in step 80 that the packet belongs to a large flow, execution proceeds to step 84, in which the rx-frames parameter is increased by or to a second predetermined value (increasing the interrupt coalescence). In step 86, a determination is made whether a predetermined amount of time has elapsed since the last short flow packet has been received. If a negative determination is made in step 86, execution proceeds to step 88, in which a determination is made whether the value of the rx-frames parameter is at a lower limit. If a negative determination is made in step 88, execution proceeds to step 90, in which the value of the rx-frames parameter is reduced by a factor of x (e.g., 2). Execution then returns to step 80. Alternatively, if a positive determination is made in step 88, execution returns to step 80.

If in step 86 it is determined that a predetermined amount of time has elapsed since the last short flow packet has been received, execution proceeds to step 92. In step 92, a determination is made whether the value of the rx-frames parameter is at an upper limit. If a negative determination is made in step 92, execution proceeds to step 94, in which the value of the rx-frames parameter is increased by a factor of y (e.g., 2) and execution returns to step 90. If a positive determination is made in step 94, execution returns to step 90.

In one example implementation, various devices involved in implementing the embodiments described herein can include software for achieving the described functions. For example, referring now to FIG. 5, a network node for use in implementing embodiments described herein, represented in FIG. 5 by a VIC 110, may include a pacer module 112 and an FIC module 113, each of which comprises software embodied in one or more tangible media for facilitating the activities described herein. The VIC 110 may also include or have associated therewith a memory device (or memory element) for storing information to be used in achieving the functions as outlined herein, including, for example, flow tables 114. Additionally, the VIC 110 may include a processor 116 capable of executing software or an algorithm (such as embodied in modules 112, 113) to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Figure 5:
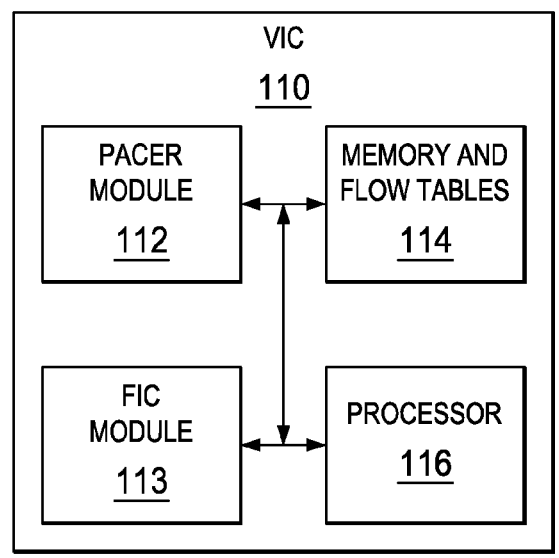
FIG. 5 is a simplified block diagram of a network element, such as a virtual interface card, for implementing data packet transmission latency reduction techniques in a data center environment in accordance with an embodiment of the present disclosure.

Note that in certain example implementations, the functions outlined herein and in FIG. 5 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of multiple components. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    maintaining at a network element a flow table, wherein the flow table comprises a plurality of flow table entries and wherein each of the flow table entries corresponds to one of a plurality of active data flows in a network;
    subsequent to receipt at the network element of a data packet of one of the active flows, characterizing the one of the active flows as a large flow or a short flow using values contained in the flow table entry corresponding to the one of the active flows; and
    processing the received packet in accordance with the characterization, wherein the processing the received packet in accordance with the characterization comprises, if the one of the flows is characterized as a large flow, pacing transmission of packets of the one of the flows using a token bucket to control a rate at which packets of the one of the flows are transmitted, wherein packets awaiting transmission are queued in a buffer.

2. The method of claim 1, wherein the pacing is deployed using a dynamic pacing strategy, wherein a bucket fill rate is modified depending on an amount of data of the one of the flows received during a predetermined time period.

3. The method of claim 1, wherein the processing the received packet in accordance with the characterization comprises:
    reducing an interrupt coalescence ("IC") if the one of the flows is a short flow; and
    increasing the IC if the one of the flows is a large flow.

4. The method of claim 1, wherein the characterizing includes determining whether the one of the flows has a recent start time.

5. The method of claim 1, wherein the characterizing includes determining whether the one of the flows occurs frequently.

6. The method of claim 1, wherein the characterizing includes determining whether a flow rate of the one of the flows is low.

7. Non-transitory tangible media having encoded thereon logic that includes instructions for execution and when executed by a processor performing operations comprising:
    maintaining at a network element a flow table, wherein the flow table comprises a plurality of flow table entries and wherein each of the flow table entries corresponds to one of a plurality of active data flows in a network;
    subsequent to receipt at the network element of a data packet of one of the active flows, characterizing the one of the active flows as a large flow or a short flow using values contained in the flow table entry corresponding to the one of the active flows; and
    processing the received packet in accordance with the characterization, wherein the processing the received packet in accordance with the characterization comprises, if the one of the flows is characterized as a large flow, pacing transmission of packets of the one of the flows using a token bucket to control a rate at which packets of the one of the flows are transmitted, wherein packets awaiting transmission are queued in a buffer.

8. The media of claim 7, wherein the pacing is deployed using a dynamic pacing strategy, wherein a bucket fill rate is modified depending on an amount of data of the one of the flows received during a predetermined time period.

9. The media of claim 7, wherein the processing the received packet in accordance with the characterization comprises:
    reducing an interrupt coalescence ("IC") if the one of the flows is a short flow; and
    increasing the IC if the one of the flows is a large flow.

10. The media of claim 7, wherein the characterizing includes determining whether the one of the flows has a recent start time.

11. The media of claim 7, wherein the characterizing includes determining whether the one of the flows occurs frequently.

12. The media of claim 7, wherein the characterizing includes determining whether a flow rate of the one of the flows is low.

13. An apparatus, comprising:
    a memory for storing data; and
    a processor for executing instructions associated with the data, wherein the apparatus is configured for:
    maintaining at a network element a flow table, wherein the flow table comprises a plurality of flow table entries and wherein each of the flow table entries corresponds to one of a plurality of active data flows in a network;

subsequent to receipt at the network element of a data packet of one of the active flows, characterizing the one of the active flows as a large flow or a short flow using values contained in the flow table entry corresponding to the one of the active flows; and processing the received packet in accordance with the characterization, wherein if the one of the flows is characterized as a large flow, pacing transmission of packets of the one of the flows using a token bucket to control a rate at which packets of the one of the flows are transmitted, wherein packets awaiting transmission are queued in a buffer.

14. The apparatus of claim 13, wherein the pacing is deployed using a dynamic pacing strategy, wherein a bucket fill rate is modified depending on an amount of data of the one of the flows received during a predetermined time period.

15. The apparatus of claim 13, wherein the processing the received packet in accordance with the characterization comprises:

reducing an interrupt coalescence ("IC") if the one of the flows is a short flow; and increasing the IC if the one of the flows is a large flow.

16. The apparatus of claim 13 comprising a virtual interface card for dynamically instantiating PCI devices on a server.

17. The apparatus of claim 13, wherein the characterizing includes at least one of determining whether the one of the flows has a recent start time, determining whether the one of the flows occurs frequently and determining whether a flow rate of the one of the flows is low.

18. A method comprising:

maintaining at a network element a flow table, wherein the flow table comprises a plurality of flow table entries and wherein each of the flow table entries corresponds to one of a plurality of active data flows in a network;

subsequent to receipt at the network element of a data packet of one of the active flows, characterizing the one of the active flows as a large flow or a short flow using values contained in the flow table entry corresponding to the one of the active flows; and processing the received packet in accordance with the characterization, wherein the processing the received packet in accordance with the characterization comprises:

reducing an interrupt coalescence ("IC") if the one of the flows is a short flow; and the IC if the one of the flows is a large flow.

19. Non-transitory tangible media having encoded thereon logic that includes instructions for execution and when executed by a processor performing operations comprising:

maintaining at a network element a flow table, wherein the flow table comprises a plurality of flow table entries and wherein each of the flow table entries corresponds to one of a plurality of active data flows in a network;

subsequent to receipt at the network element of a data packet of one of the active flows, characterizing the one of the active flows as a large flow or a short flow using values contained in the flow table entry corresponding to the one of the active flows; and processing the received packet in accordance with the characterization, wherein the processing the received packet in accordance with the characterization comprises:

reducing an interrupt coalescence ("IC") if the one of the flows is a short flow; and the IC if the one of the flows is a large flow.

20. An apparatus, comprising:

a memory for storing data; and a processor for executing instructions associated with the data, wherein the apparatus is configured for:

maintaining at a network element a flow table, wherein the flow table comprises a plurality of flow table entries and wherein each of the flow table entries corresponds to one of a plurality of active data flows in a network;

subsequent to receipt at the network element of a data packet of one of the active flows, characterizing the one of the active flows as a large flow or a short flow using values contained in the flow table entry corresponding to the one of the active flows; and processing the received packet in accordance with the characterization, wherein the processing the received packet in accordance with the characterization comprises:

reducing an interrupt coalescence ("IC") if the one of the flows is a short flow; and the IC if the one of the flows is a large flow.

* * * * *